United States Patent [19]

Dagan

[11] Patent Number: 5,322,973
[45] Date of Patent: Jun. 21, 1994

[54] AERIAL CLOSURE

[75] Inventor: Gideon B. Dagan, Venice, Calif.

[73] Assignee: Communication Technology Corporation, Dallas, Tex.

[21] Appl. No.: 847,942

[22] Filed: Mar. 6, 1992

[51] Int. Cl.[5] .......................................... H02G 15/113
[52] U.S. Cl. ...................................... 174/92; 174/41; 174/93
[58] Field of Search ........................ 174/91, 92, 93, 41

[56] References Cited

U.S. PATENT DOCUMENTS

| | | | |
|---|---|---|---|
| 3,701,835 | 10/1972 | Eisele et al. | 174/41 |
| 3,836,694 | 9/1974 | Kapell | 174/92 X |
| 4,390,744 | 6/1983 | Suffi et al. | 174/41 |
| 4,558,174 | 12/1985 | Massey | 174/92 |
| 4,647,713 | 3/1987 | de Nijs et al. | 174/92 X |
| 4,701,574 | 10/1987 | Shimirak et al. | 174/93 |
| 4,704,499 | 11/1987 | Faust | 174/92 |
| 4,721,830 | 1/1988 | Dagan et al. | 174/41 |
| 4,810,829 | 3/1989 | Rutenbeck et al. | 174/41 |
| 4,857,672 | 8/1989 | Rebers et al. | 174/93 |
| 4,880,676 | 11/1989 | Puigcerver et al. | 174/77 R X |
| 4,944,973 | 7/1990 | Follette | 428/36.1 |
| 4,963,698 | 10/1990 | Chang et al. | 174/77 R |
| 4,963,700 | 10/1990 | Olsen et al. | 174/138 F |
| 5,214,248 | 5/1993 | Jamison | 174/92 |

FOREIGN PATENT DOCUMENTS

2334429  1/1975  Fed. Rep. of Germany ........ 174/92

Primary Examiner—Morris H. Nimmo
Attorney, Agent, or Firm—Crutsinger & booth

[57] ABSTRACT

An aerial closure for protecting an electrical or optical cable splice from weathering forces is provided. The aerial closure has a central header portion and wing-like housing segments that may enclose a cable splice. The wing-like housing segments may be raised, providing access to the cable splice from either side of the cable splice and below the cable splice. Each end of the aerial closure has a seal assembly for sealingly engaging the ends of the cable segments whereby the ends of the aerial closure are also protected from the weathering elements. The seal assembly has concentrically circular and corrugated features thereon so that an appropriately sized hole may be cut into the seal assembly for any standard cable size. The corrugated features allow marking the standard cable sized alternatingly on either side of the seal assembly so that it is easier to find and cut the correct sized hole for the cable. The housing segments may be locked with a simple latch, a nut and bolt assembly, or both. In the closed position, the bottom edges of the housing segments interlock for mechanical strength, but also have small spaces or cracks to allow any water to drain from the closure.

40 Claims, 10 Drawing Sheets

AERIAL CLOSURE

TECHNICAL FIELD

The invention relates to an aerial closure for telecommunication cables and particularly for forming an enclosure for splicing electrical or optical cable.

BACKGROUND OF THE INVENTION

Aerial closures are generally employed to enclose joined or spliced suspended cable for protecting the splice or termination from the elements.

The telecommunications cables are suspended between poles, towers, or the like. Typically, twenty-five or more pairs of insulated wires for conducting electrical signals or optical fibers for conducting light signals are enclosed in a braided sheathing which in turn is enclosed in an insulated cable sheath. In some telecommunications cable, the cable does not have sufficient inherent strength to support its own weight between the poles, therefore, a support strand is suspended between the poles above and in parallel with the cable. Periodically along the length of the cable it is tied or clamped to the support strand. In other installations, the support strand is enclosed in the sheathing around the telecommunication cable to form a self-supporting cable.

A splice in the telecommunication cable is generally required for connecting ends of cable segments. For example, a splice is required where the distance between the two places to be connected is greater than the length of a roll of telecommunications cable. A splice is also required to form a branch or drop line that extends from the main cable to service a particular subdivision, facility, or individual customer.

Terminal blocks are generally employed for connecting corresponding pairs of conductors to form a splice in the aerial terminal system. An enclosure of the type disclosed in U.S. Pat. No. 4,721,830 is often employed for enclosing cable splices for protection from the environment, plants, and animals.

The typical aerial cable enclosure includes a housing formed of two housing members joined by a hinge and a header member connected to the support strand. The aerial closure disclosed in U.S. Pat. No. 4,721,830 is constructed such that one of the housing members is suspended from the header member by a pair of straps and the other housing member is suspended from the first housing member by a hinge. When the housing members are in the open position and disengaged from the header member, the housing members are suspended below the cable segments, thereby providing access to the ends of a cable segments.

Aerial terminal systems incorporating cable enclosures of the type disclosed in U.S. Pat. No. 4,721,830 are typically installed a predetermined distance, for example, 18 inches, from the center of a pole in a series of poles supporting the telecommunications cable. An opening is formed in the cable sheath and a strand clamp is attached to a support strand or messenger cable that conventionally supports the weight of the telecommunication cable.

Aerial cable enclosures of the type disclosed in U.S. Pat. No. 4,721,830 are commercially available from Communications Technology Corporation of Dallas, Tex. under its registered trademark "HAWK" and with terminal blocks mounted in the enclosure under the trademark "TERMAX".

Cable closures of the type disclosed in U.S. Pat. No. 4,810,829 and commercially available from Minnesota Mining and Manufacturing Company under the trademark "SLICK" comprise a generally cylindrical casing formed as a single unit with a compression molded longitudinally extending hinge on a single deformable unit to provide a pair of semi-cylindrical casing sections, one of which is connectable by hangers to a support cable. One of the semi-cylindrical casing sections is pivotally movable relative to the other semi-cylindrical casing section to provide access to the cable splice.

End seals for aerial closures are disclosed in U.S. Pat. No. 4,701,574 and U.S. Pat. No. 4,857,672 to provide environmental protection between the ends of the closure and cable segments.

SUMMARY OF THE INVENTION

An aerial closure is for enclosing electrical or optical cable splices in cable segments suspended from a support strand. The aerial closure assembly generally includes at least one elongated header having spaced longitudinal edges; at least one bracket, clamp, hook, or other suitable means for securing the header relative to a support strand such that each header is spaced from and generally parallel to the support strand and cable; a plurality of housing segments; hinges or the like for pivotally securing the housing segments adjacent the longitudinal edges of the header such that the housing segments are movable between a closed or lowered position wherein the header and the housing segments envelope the cable and an open or raised position wherein the housing segments are elevated to provide access to the cable splice and free clearance on both sides and below the cable splice.

BRIEF DESCRIPTION OF THE DRAWING

Drawings of a preferred embodiment of the invention are annexed hereto so that the invention may be better and more fully understood, wherein.

Numeral references designate like parts throughout the various figures of the drawings.

DESCRIPTION OF THE PREFERRED EMBODIMENT

Referring now to FIGS. 1-5 of the drawing, the numeral 10 generally designates a preferred embodiment of an aerial closure according to the invention. The aerial closure 10 is suitable for enclosing electrical or fiber optical cable splices between cable segments or drop wires (not shown) suspended from a support strand 12. The support strand 12 supports the electrical or optical cable and the aerial closure 10. In the preferred embodiment of the invention, the support strand 12 also supports the aerial closure 10 above and out of the way of the lineman's access to the cable splice.

Referring to FIGS. 1-4, an elongated header 14 serves as the backbone of the aerial closure 10 and supports a pair of wing-like housing segments 22a and 22b secured by hinges to spaced-apart longitudinal edges 16 and 18 of the header 14.

Figure 2:
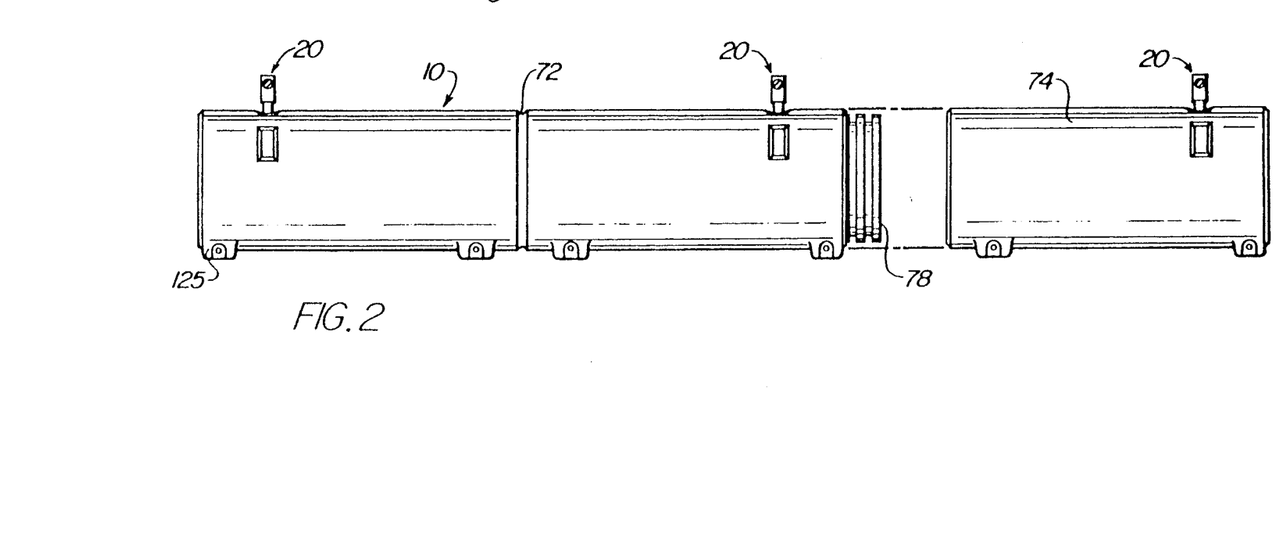
FIG. 2 is a side elevational view of the aerial closure showing the housing segments in a closed or lowered position and also showing an extension adapter that may be added to the aerial closure.
Figure 3:
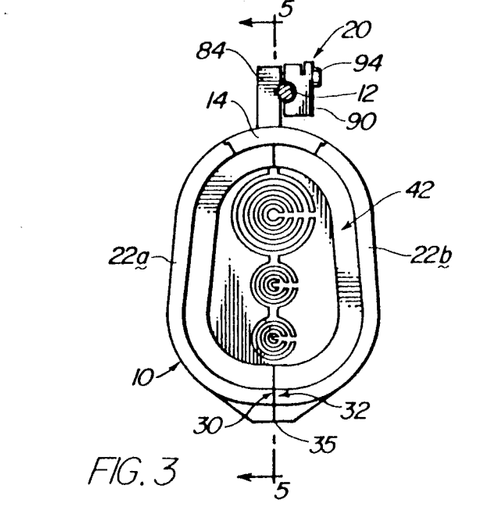
FIG. 3 is an end view of the aerial closure showing the housing segments in a closed position.

As best illustrated in FIGS. 2-5 of the drawing, the aerial closure 10 has two or more hanging bracket assemblies 20 for securing the elongated header 14 relative to a support strand 12 such that the header 14 is suspended below and generally parallel to the support strand 12. The aerial closure 10 as a whole is suspended from the support strand 12 such that when the housing segments 22a and 22b are in a closed or lowered position, as illustrated in FIGS. 2-3, the header 14 and housing segments 22a and 22b form an elongated enclosure generally aligned with the cable segments suspended beneath the support strand 12.

Figure 1:
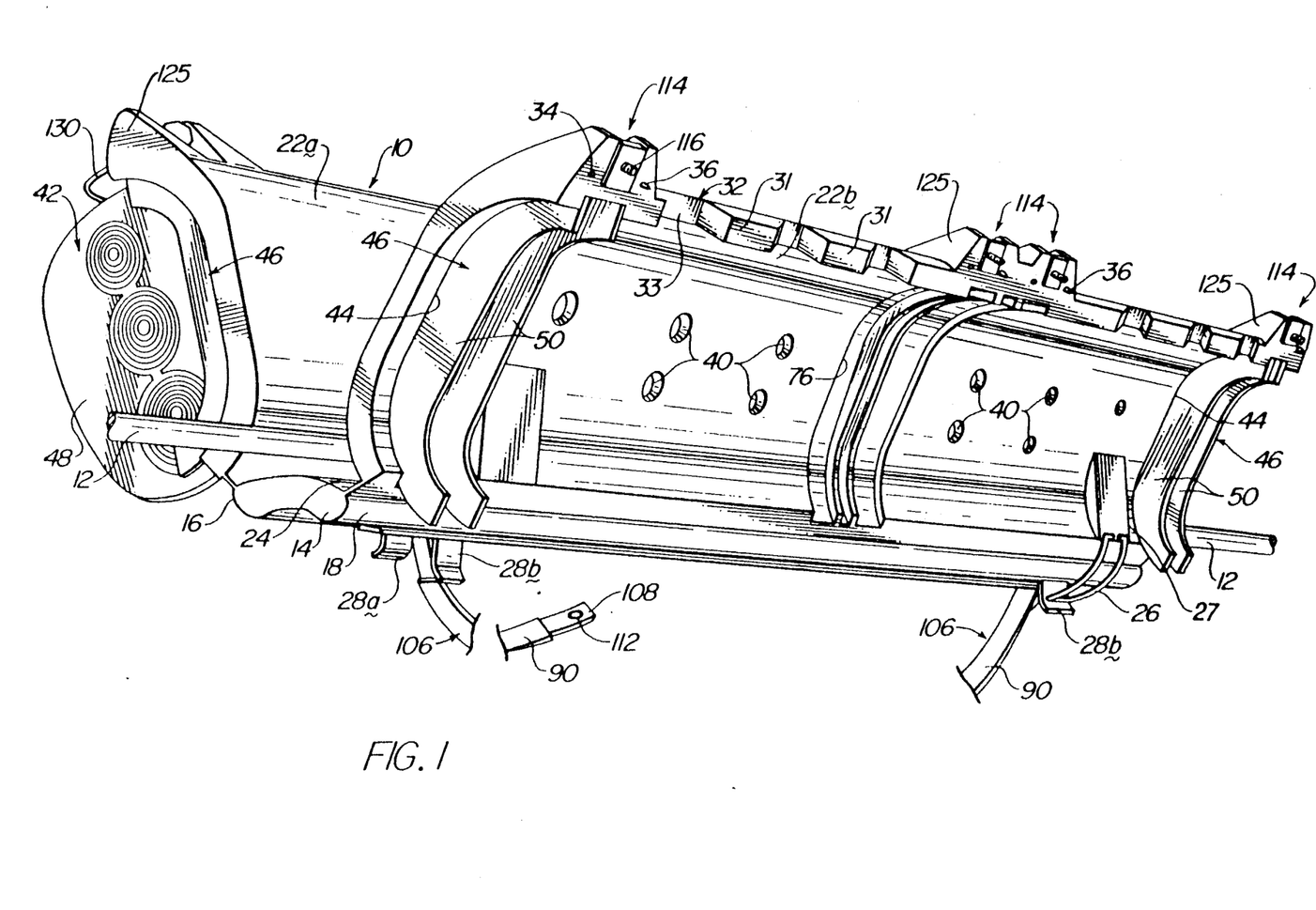
FIG. 1 is a perspective view of an aerial closure showing the housing segments in an open or raised position.
Figure 4:
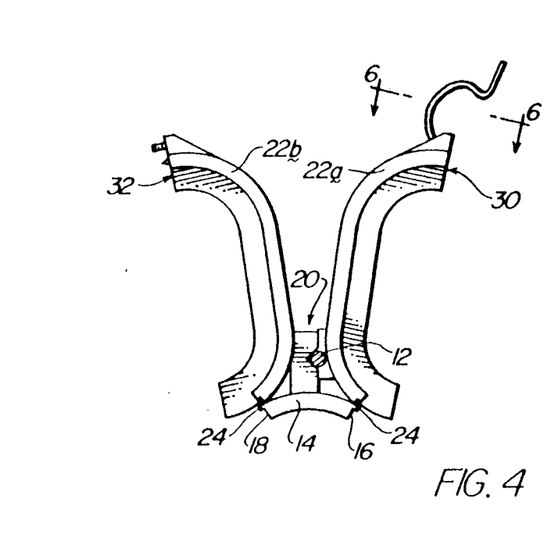
FIG. 4 is an end view of the aerial closure showing the housing segments in an open position.

The aerial closure includes hinges 24 for pivotally securing the housing segments 22a and 22b adjacent the longitudinal edges 16 and 18 of the header 14. The hinges 24 allow each housing segment 22a and 22b to move between a closed or lowered position as shown in FIGS. 2 and 3 wherein the header 14 and the housing segments 22a and 22b encircle an electrical or optical cable splice and an open or raised position as illustrated in FIGS. 1 and 4, wherein the housing segments 22a and 22b are elevated to provide access to a cable splice. The wing-like opening mechanism of the aerial closure 10 provides free clearance on both sides and below the cable splice, which makes the lineman's work on the cable splice easier.

As best illustrated in FIG. 1, the wing-like housing segments 22a and 22b have selectively operable bails 26 movably secured relative to retainer brackets 28 secured to the header 14. Each retainer bail 26, in the illustrated embodiment, is a generally U-shaped member having spaced legs with inwardly extending projections which are retained in grooves in housing segments 22a and 22b by ribs 27. When a housing segment is raised to the fully open position, the lineman can position the retainer bail 26 such that it engages retainer bracket 28 thereby supporting the housing segments 22a and 22b in the open position. The housing segments are held above and away from the cable splice while both of the lineman's hands remain free to work on the splice. In the illustrated embodiment, the retainer bracket 28 is formed by a channel shaped member having outwardly deflected edge portions on the flanges 28a and 28b to releasably secure an end of retainer bail 26.

When the splice work is completed, the lineman can slightly raise the housing segment 22a, move the retainer bail 26 out of engagement with the retainer bracket 28 and lower the housing segment to the closed position.

Figure 5:
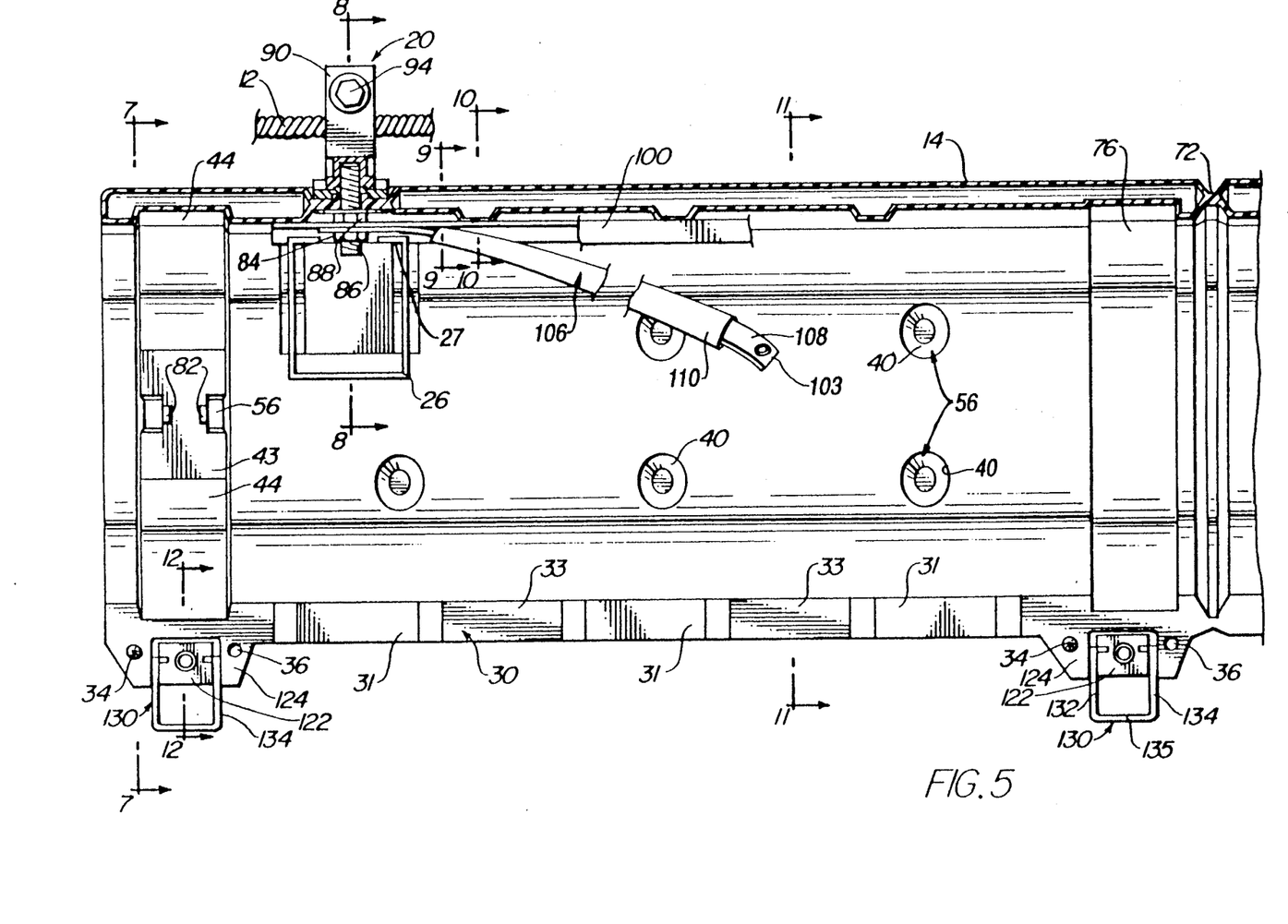
FIG. 5 is a fragmentary cross-sectional view taken along line 5—5 of FIG. 3.

As best illustrated in FIGS. 1 and 5, the wing-like housing segments 22a and 22b preferably have interlocking, non-linear edges 30 and 32, respectively, each having tongues 31 and grooves 33 spaced along the length thereof. Tongues 31 are received in grooves 33. The non-linear edge 30 on one of the housing segments mates with the corresponding non-linear edge 32 of the other housing segment 22. The non-linear edges 30 and 32 are preferably configured to prevent longitudinal movement of the housing segments 22a and 22b respective to one another and the longitudinal header 14 without restricting rotational movement of the housing segments 22a and 22b relative to the spaced-apart longitudinal edges 16 and 18 of the header 14.

Figure 23:
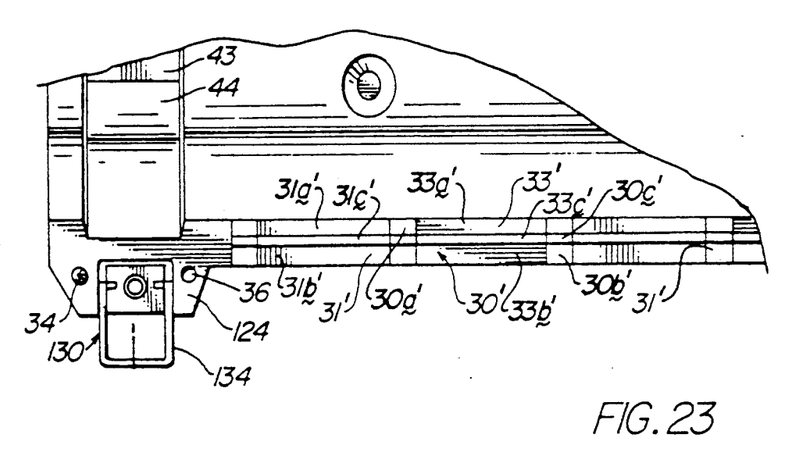
FIG. 23 is a fragmentary elevational view of a modified form of the non-linear edge of the housing.

In a modified form of the apparatus illustrated in FIG. 23, the non-linear edges 30' and 32' are formed with tongues 31' and grooves 32' which are terraced such that surfaces 33a' and 33b' lie in different planes and are joined by an inclined shoulder 33c'. Surfaces 31a' and 31b' in groove 31' lie in different planes and are joined by a shoulder 31c'.

Inclined surfaces 30a', 30b' and 30c' extend between surfaces 31a' and 33a', and 31b' and 33b' and 31c' and 33c', respectively. The terraced tongue and groove construction forms a strong rigid joint which is easily opened and closed.

As will be hereinafter more fully explained each edge 30 and 32 has a shoulder 125 configured to secure housing segments 22a and 22b in the closed position. The edges 30 and 32 of the housing segments 22a and 22b also preferably have interlocking alignment pins 34 and alignment holes 36 to help maintain the housing segments in pivotal alignment when the housing segments are closed together.

Figures 6, 7, 8:
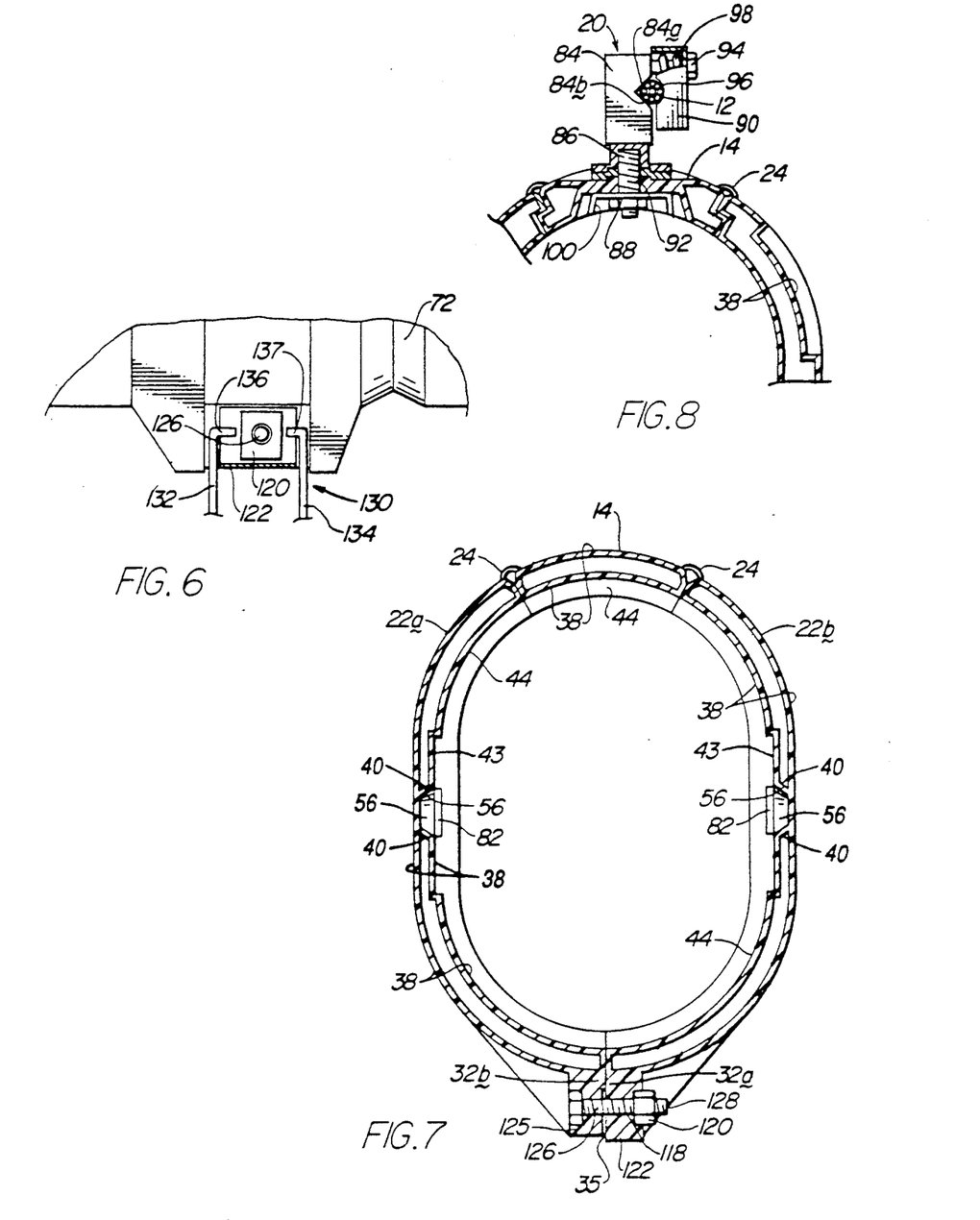
FIG. 6 is a cross-sectional view taken along line 6—6 of FIG. 4 illustrating a latch for locking the aerial closure in a closed position.
FIG. 7 is a cross-sectional view taken along line 7—7 of FIG. 5.
FIG. 8 is a cross-sectional view taken along line 8—8 of FIG. 5.
Figure 9:
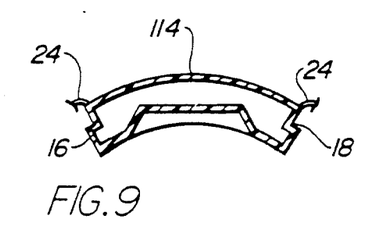
FIG. 9 is a cross-sectional view taken along line 9—9 of FIG. 5.

As best illustrated in FIGS. 3 and 7, the non-linear edges 30 and 32 also are preferably configured to leave a small gap 35 between edges 30 and 32 when housing segments 22a and 22b are in the closed position. The gap 35 permits passage of air and any liquid condensate between the non-linear edges 30 and 32 of the housing segments 22a and 22b when housing segments 22a and 22b are closed and the non-linear edges 30 and 32 are juxtaposed to one another.

In the preferred embodiment of the invention, the elongated header 14 and the housing segments 22a and 22b are unitarily formed of plastic by blow molding. The header 14 is bounded at edges 16 and 18 by spaced, longitudinally extending, deformable hinge portions 24 that movably secure spaced, wing-like housing segments 22a and 22b adjacent opposite sides of the header 14. The hinge 24 is an elongated, thin deformable portion of the plastic material joining the header 14 and housing segments 22a and 22b along the edges 16 and 18 of the header 14.

As best illustrated in FIG. 7, the header 14 and housing segments 22a and 22b of the blow molded aerial closure body have spaced double walls 38 of plastic forming interior chambers. For structural support, the walls 38 of the housing segments 22a and 22b preferably have interconnecting ribs 40 spaced over the surfaces, as illustrated in FIGS. 1 and 7 to thicken and stiffen the structural members. However, hinge portions 24 are plastically deformable.

Plastic is an ideal material for the body of aerial closure 10 because it weathers extremely well and protects a cable splice indefinitely. The unitarily formed body of aerial closure 10 is also lightweight, which makes it easy for a lineman to secure the aerial closure in position on a support strand 12.

The ends of the aerial closure 10 preferably have a seal assembly 42 providing a weatherproof seal around the cable segments. The end portions of each of the housing segments 22a and 22b and header 14 are formed to have indentations 44 for receiving and retaining a seal assembly 42.

The end seal assembly 42 generally includes end seal shell halves 46, best illustrated in FIGS. 1, 17, 18 and 19, and end seals 48, of the type illustrated in FIGS. 1, 13, 14, 15 and 16. The end seal shell halves 46 are adapted to mate with the indentations 44 and retain the end seal 48. The end seal 48 is adapted to surround a cable (not shown), such that the seal assembly 42 provides a weather-tight seal around the cable at each end of the aerial closure 10.

Each seal assembly 42 preferably includes a pair of end seal shell halves 46; a connector 54 for securing the end seal shell halves 46 to the ends of the housing segments 22; and end seals 48 engaging the end seal shell halves 46 and a cable segment. Each of the end seal shell halves 46, best illustrated in FIGS. 17-19, preferably comprises a pair of spaced flanges 50 and a web structure 52 extending between the spaced flanges 50. The connector preferably comprises one or more projections 54 on the web structure 52. As indicated in FIG. 5, the projections 54 snap into or extend into corresponding apertures or sockets 56 in central portions 43 of recesses 44 in the ends of the housing segments 22.

The end seal 48, best illustrated in FIGS. 13-16, preferably comprises an elastomeric material, such as rubber, in which appropriately sized holes may be cut to accommodate a cable segment or drop wire.

The end seal 48 preferably comprises: a plurality of elastomeric seal elements 48a and 48b having one or more sets of aligned cut-outs 58 for forming apertures, for example, 58a, 58b, and 58c extending therethrough. The elastomeric seal elements 48a and 48b may be molded together, connected by tab 60. The seal elements 48a and 48b are symmetrically molded such that when folded together about tab 60, the two seal elements mate and the apertures 58 are aligned. The seal 48a and 48b mate by way of projections 62 that engage dimples 64. The mating of projections 62 and dimples 64 maintain the apertures 58 in axial alignment.

Generally, the apertures 58 are not cut until the appropriate size of the aperture 58 has been determined according to the size of the cable segment that must be sealed therein. The apertures 58 may have concentric grooves 66 to guide snips or a knife edge in cutting the appropriate sized aperture 58 for the cable segment. Telecommunication cables come in several different sizes, but the cable sizes are sometimes very close together. In the past, linemen have had difficulty under their working conditions to distinguish between the closely spaced concentric grooves in order to cut the right sized aperture 58 for the cable segment.

Figure 13:
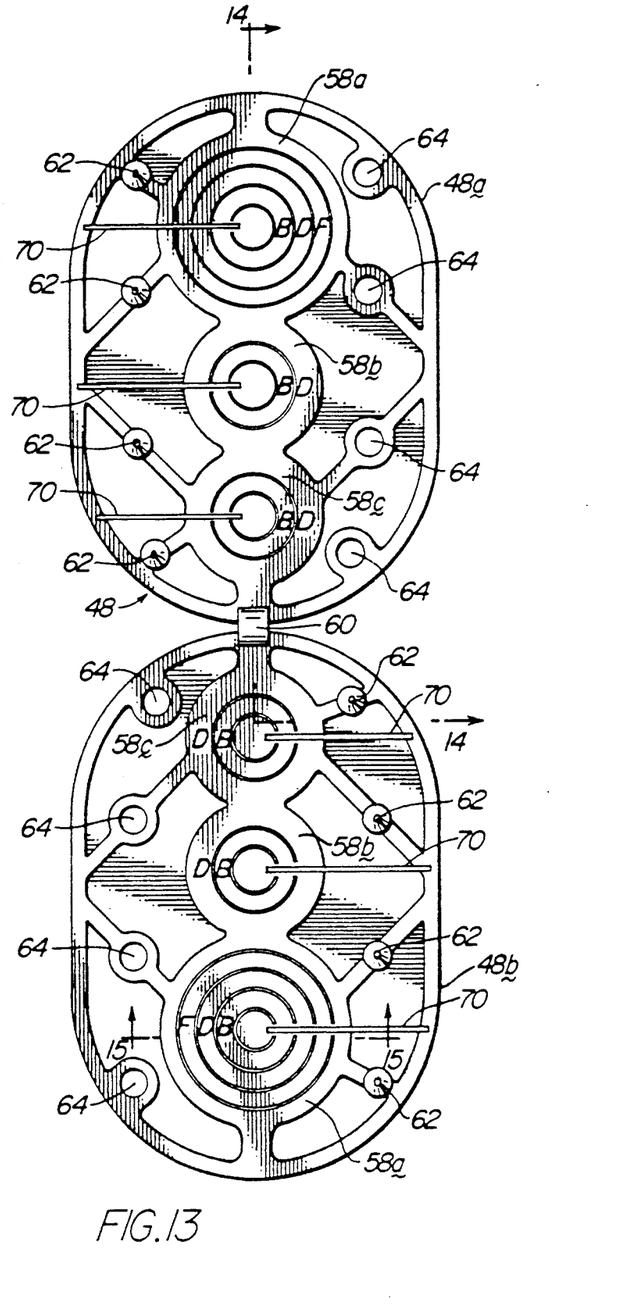
FIG. 13 is an elevational view of the inside of an end seal for the aerial closure.
Figure 14:
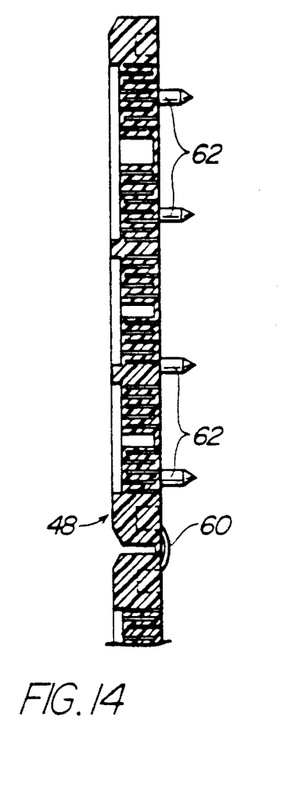
FIG. 14 is a cross-sectional view taken along line 14—14 of FIG. 13.
Figure 15:
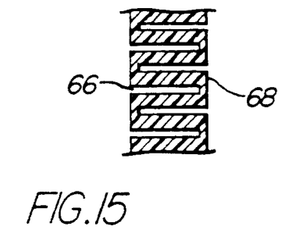
FIG. 15 is an enlarged cross-sectional view taken along line 15—15 of FIG. 13.

Therefore, in one aspect of the invention and as best illustrated in FIGS. 14 and 15, the apertures 58 are formed in a corrugated configuration such that on one side of the seal element a concentric groove 66 corresponds to the center of a concentric rib 68. Thereby, even numbered sizes, for example, of cable apertures may be cut from one side of the seal element, whereas odd numbered sizes of cable apertures may be cut from the other side of the seal element. Half of the total number of grooves 66 appear on one side of the seal elements, thereby making the grooves easier to distinguish. As best illustrated in FIG. 13, the concentric ribs 68 may be marked with letters, numbers, or other indicia of the cable size corresponding to the adjacent groove 66.

Figure 16:
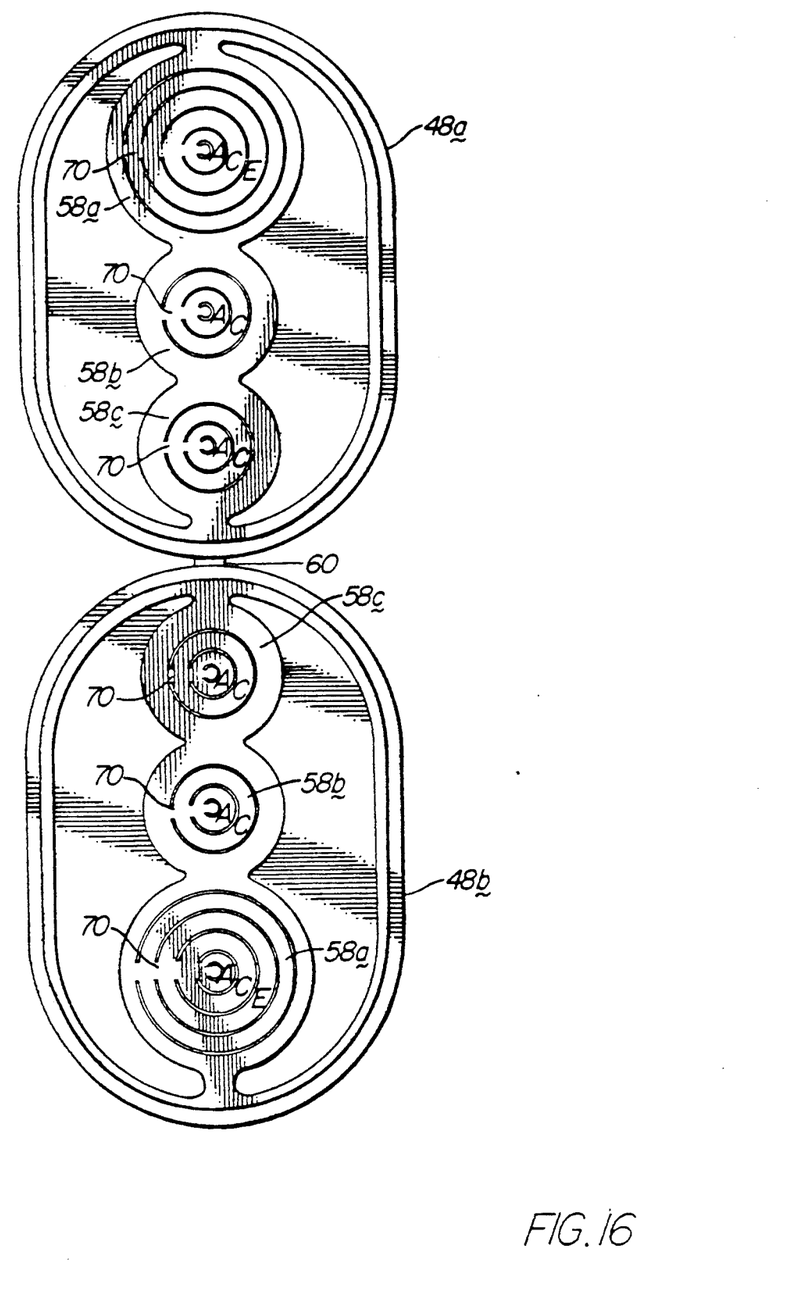
FIG. 16 is an elevational view of the outside of the end seal.
Figure 17:
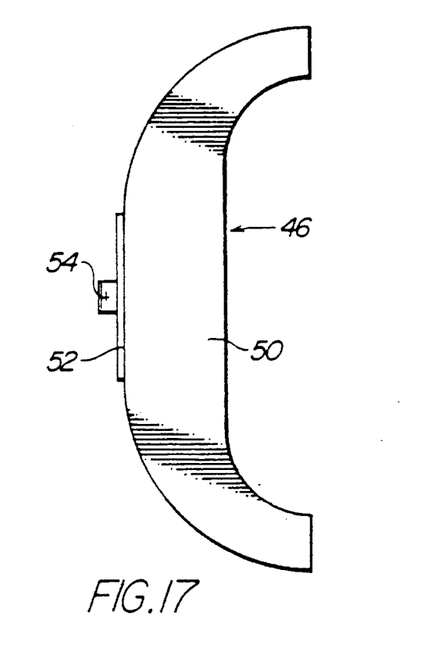
FIG. 17 is an end view of the end seal shell.
Figure 18:
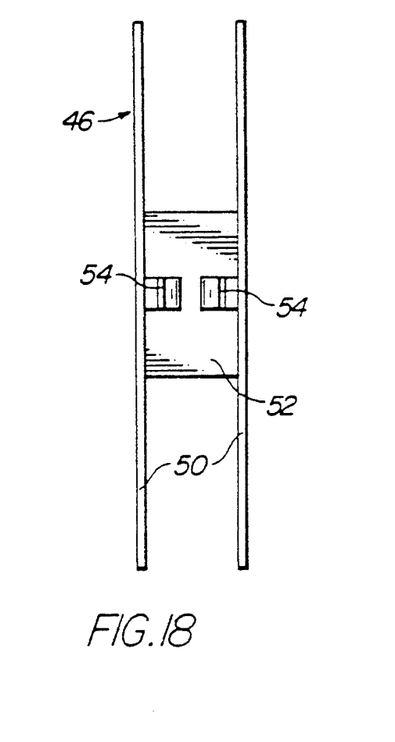
FIG. 18 is a plan view of the end seal shell of FIG. 17.
Figure 19:
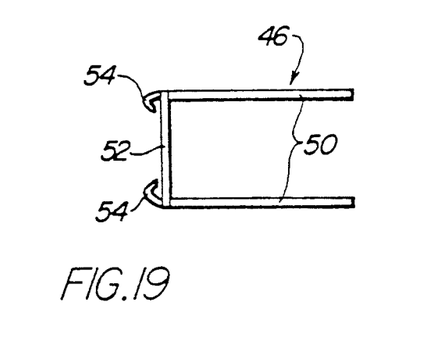
FIG. 19 is a side elevational view thereof.

As illustrated in FIGS. 13 and 16, the elastomeric seal elements 48a and 48b preferably have a slot groove 70 extending from the center of each aperture 58 toward an edge of the elastomeric seal element. The slot grooves 70 are for guiding the lineman's knife to cut the seal element open from the aperture 58 to the edge of the end seal element. This cut allows the lineman to spread the cut along the line of slot groove 70 so that the end seal element may be placed around a cable segment or drop wire. This operation is easier than attempting to thread a cable segment through the end seal element. Also, if the aerial closure or an end seal is being replaced for any reason, the splice does not have to be undone to connect or disconnect the end of each cable segment of the splice through the end seal elements.

As best illustrated in FIG. 16, the slot groove 70 in elastomeric seal element 48a extends toward the edge of the end seal element in a different direction than the slot grooves 70 in elastomeric seal element 48b. Therefore, when the two end seal elements 48a and 48b are placed around a cable or drop wire and aligned adjacent one another, the cuts along slot grooves 70 of the two end seal elements do not overlap. Thereby, when the seal assembly 42 is closed and positioned the ends of the aerial closure, the cuts do not compromise the end seals.

As best illustrated in FIG. 2, the header 14 and the housing segments 22a and 22b preferably have a circumferential groove 72 formed thereon. The groove 72 is transverse to the longitudinal dimension of the body of the aerial closure 10 and preferably the groove 72 symmetrically bisects the aerial closure. Thereby, if desired, the blow molded body of the aerial closure 10 may be cut in half and adapted for use as an extension 74 as shown in FIG. 2. The header 14 and the housing segments 22a and 22b preferably have indentations 76 near both sides of groove 72. Preferably, the indentations are similar to the indentations 44. The indentations 76 near the groove 72 are for retaining an extension adapter 78 adjacent the indentation 76, similar to how the indentation 44 retains the end seal shell halves 46 adjacent the end of the body of the aerial closure 10.

Figure 20:
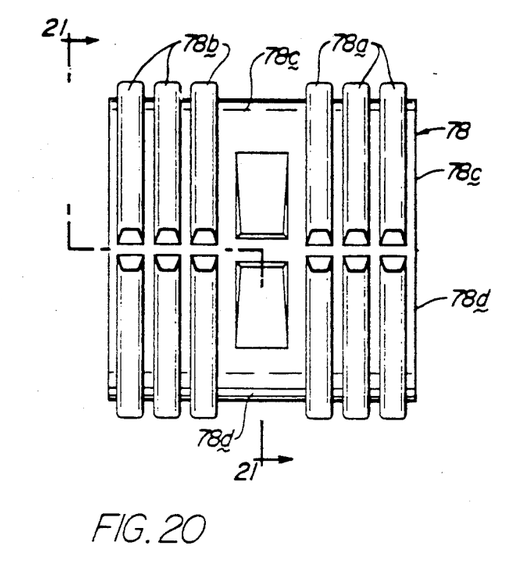
FIG. 20 is a top plan view of the extension adapter.
Figure 21:
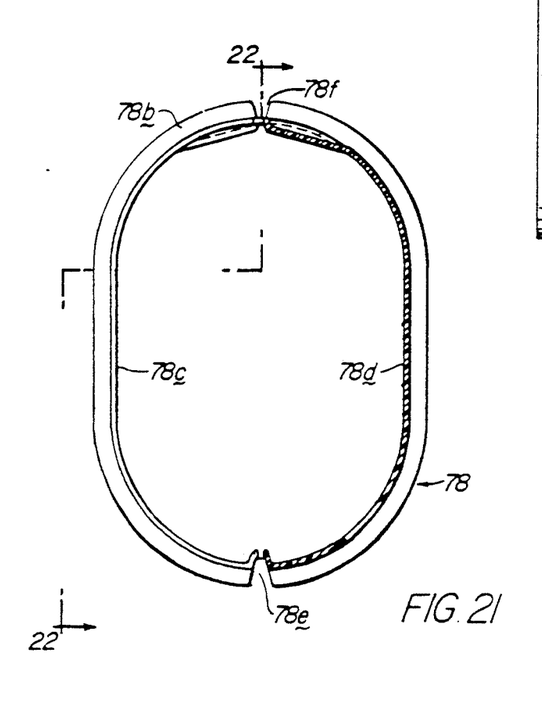
FIG. 21 is a cross-sectional view taken along line 21—21 of FIG. 19.
Figure 22:
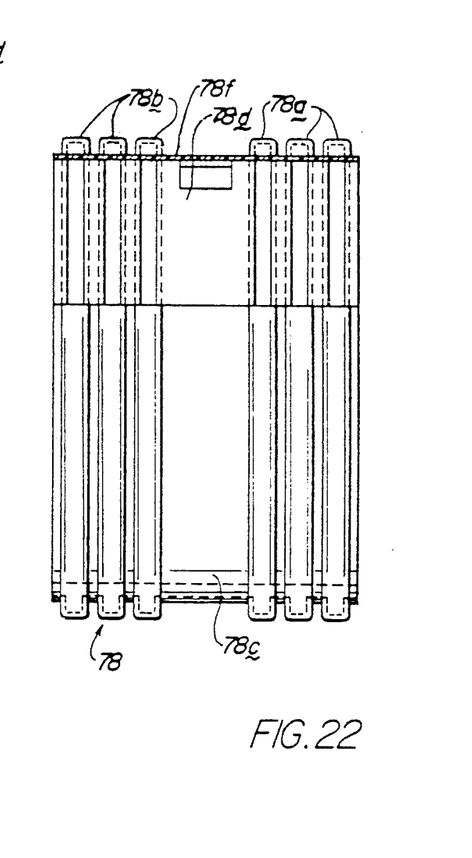
FIG. 22 is a cross-sectional view taken along line 21—21 of FIG. 20.

As illustrated in FIG. 2, the extension of the aerial closure is accomplished by means of a suitable extension adapter 78, illustrated in FIGS. 20-22. The extension adapter 78 may be of substantially identical dimensions as the end seal shell halves 46 of the seal assembly 42 so that either a seal assembly 42 or an extension adapter 78 may be connected to the ends of the aerial closure. If the indentations 44 and the indentations 76 near the groove 72 are substantially identical, a symmetrical extension adapter 78 may be used to connect half 74 of another aerial closure unit 10 to either end portion of the aerial closure 10 as illustrated in FIG. 2. If desired, the whole of another aerial closure unit 10 may be connected by means of the same extension adapter 78 because the indentations 44 on either side of the aerial closure body are preferably symmetrical.

The extension adapter 78 is preferably a hollow tubular member having ribs 78a and 78b formed on tube segments 78c and 78d hingedly secured together by a plastically deformable hinge portion 78f. A groove 78e is formed between tube segments 78c and 78d to provide an open cut between the tube segments of extension adapter 78 for mounting the adapter on a cable. When edges of the extension adapter 78 pulled apart along groove 78e, tube segments 78c and 78d pivot about hinge portion 78f.

As best illustrated in FIG. 5, each of the indentations 44 on the housing segments 22a and 22b preferably has sockets 56 formed therein. The sockets 56 are configured to retain the end seal shell halves 46 or extension adapter 78 in the indentations 44. The end seal shell halves 46 have projections 54 for snapping the end seal shell halves 46 in the indentations 44. In the illustrated embodiment, deformable projections 54 have inclined shoulders which engage deformable projections 82 to removably secure shell halves 46 inside opposite ends of the closure 10.

As illustrated in FIGS. 3, 5 and 8, the aerial closure 10 has a hanging bracket assembly 20 for attaching the header 14 of the attachment means to the support strand 12. The hanging bracket assembly 20 includes an arm 84; suitable fastening means, such as stud 86 and nut 88, for securing the arm 84 to the elongated header 14; and a clamp 90 secured to the arm 84. One end of the stud 86 is threaded into the arm 84, and the other end of the stud 86 is positioned through a hole 92 in the header 14. The nut 88 is threaded onto the stud 86 on the portion of the stud 86 extending through the lower surface of header 14, thereby securing the arm 84 and clamp assembly 90 to the header 14.

As best illustrated in FIG. 3 and 5, the clamp 90 is channel shaped to provide a pair of spaced flanges and a central web secured to arm 84 with a bolt 94. Clamp 90 may pivot about bolt 94. The pivoting clamp 90 may be rotated so that the support strand 12 may be passed between the arm 84 and clamp 90. Once the support strand 12 is positioned between the arm 84 and the clamp 90, the bolt 94 may be tightened to secure the hanging bracket assembly to the support strand 12.

Preferably the aerial closure 10 is designed so that the ends of the cable segments (not shown) may be grounded by electrical connection to the conductive interior of the support strand 12. As illustrated in FIG. 5, the hanging bracket assembly 20 is formed of electrically conductive material and the arm 84 has inclined surfaces 84a and 84b thereon forming a tapered slot and clamp 90 has inclined surfaces 90a and 90b forming a tapered slot 96 configured to displace insulation on the support strand 12. When the bolt 94 is tightened, the clamp 90 urges the support strand 12 toward the insulation displacing surfaces 90a and 90b in slot 96, which pierce or displace the insulation on the support strand 12, thereby making electrical contact with the conductor therein.

Preferably the hanging bracket assembly 20 includes a spring 98 or similar retaining means adjacent the bolt 94 to maintain the clamp 90 in a predetermined position relative to the arm 84.

It should be appreciated that the provision of tapered slots formed by inclined surfaces 84a, 84b, 90a and 90b facilitates connecting hanging bracket assembly 20 to support strands of various diameters.

The aerial closure 10 also includes an electrically conductive ground bar 100 that is preferably electrically connected to each of the hanging bracket assemblies 20. For example, the ground bar 100 may have a hole 102 so that it may be secured to the lower extending stud 86 by a second nut 84. In turn, the ground bar 100 is connected to the ends of the cable segments by bonding harness assemblies 106. Each assembly 106 generally includes a strip 108 formed of conductive material and an electrically insulating sleeve 90. The strip 108 has a hole 112 at one end thereof so that it may be secured to the lower extending stud 86 with the second nut 104 in electrical contact with the ground bar 100. The electrically insulating sleeve 110 allows the lineman to handle the bonding harness assembly 106 and connect the other end of the strip 108 to the grounded sheathing of one of the cable segments. Thereby the cable splice may be electrically grounded at all times.

As best illustrated in FIGS. 1, 2, 5, and 6, the aerial closure 10 has at least one locking assembly 114 for securing or clamping the housing segments 22a and 22b together in an engaged, closed position when the cable include any suitable mechanism on one of the housing segments 22a and 22b engageable with another of the housing segments for detachably securing a first of the housing segments to a second of the housing segments.

The preferred embodiment of the invention has locking assemblies 114 that operate as a lug bolt and nut assembly, a latch assembly, or both, depending on the conditions under which the closure is to be used.

Figures 10, 11, 12:
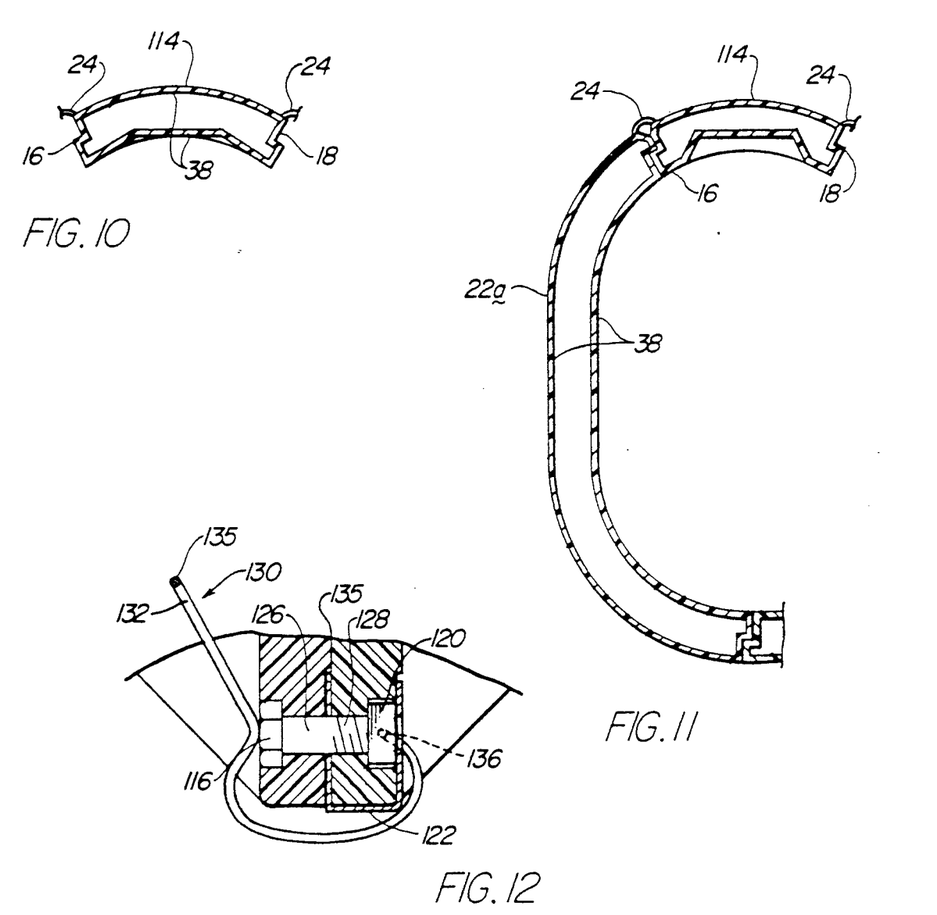
FIG. 10 is a cross-sectional view taken along line 10—10 of FIG. 5.
FIG. 11 is a cross-sectional view taken along line 11—11 of FIG. 5.
FIG. 12 is a cross-sectional view taken along line 12—12 of FIG. 5.

The locking assembly 114 includes a threaded lug bolt 116, illustrated in FIGS. 1, 6 and 12 positioned to extend through passages 118 formed in shoulders 125 adjacent the lower edges of housing segments 22. When the housing segments 22a and 22b are in the closed position, the passages 118 are aligned.

A generally conical shaped alignment pin 36 and a generally conical shaped alignment hole 34 are formed on each shoulder 125 to align axes of holes 118 when shoulders 125 on housing segments 22a and 22b are moved together.

One of the passages 118 is provided with a nut 120 secured to shoulder 125 by a generally U-shaped retainer clip 122 having aligned apertures in spaced legs through which lug bolt 116 extends to threadedly engage nut 120.

The other of the passages 118 may be threaded to retain the lug bolt 116 in position. If the body of the aerial closure 10 is formed of blow molded plastic, then the threaded lug bolt 116 may be used to cut corresponding threads into the plastic material forming the shoulder through which passage 118 is formed, thereby securing the lug 116 to the housing segment 22. Preferably, the stem or neck 126, illustrated in FIG. 7, on the lug 116 is elongated and has a smaller diameter than the cross-section of the threads 128 formed on the end of lug 116. Thus, the threads 128 on the lug 116 cut corresponding threads into the sides of the plastic material forming the passage 118, but once the threads 128 of the lug 116 extend through the passage 118, the stem or neck 126 on the lug allows the lug to freely rotate. Though the bolt 116 is thereby free to rotate, it is also retained in the passage 118 by the threads 128.

The locking assembly 114 may additionally or alternatively include a latch mechanism comprising a latch member 130 pivotally secured to one of the housing segments 22a or 22b. The latch member 130 is movable between a first position engaged to an opposing housing segment and a second position disengaged from the opposing housing segment. The latch member 130 is preferably configured such that it may latch over the head of threaded lug bolt 116 without interfering with the operation of the lug bolt or tool access to the lug. Thereby, the locking assembly 114 can function with the threaded lug mechanism, the latching mechanism, or both.

The latch member 130 is formed of shaped resilient wire to provide a pair of generally C-shaped legs 132 and 134 having ends joined by a curved segment 135. Projections 136 and 137, extending inwardly between ends of legs 132 and 134, are held in a groove 145 formed in shoulder 125 adjacent nut 120 by the retainer clip 122. When shoulders 125 on housing segment 22a and 22b are closely spaced, the C-shaped legs of latch member 130 engage outer surfaces of shoulders 125 to hold the wing-like housing segments 22a and 22b in a closed position.

Having described the invention, what is claimed is:

1. An aerial closure for enclosing electrical or optical cable splices in cable segments suspended from a support strand comprising: elongated header means for supporting the closure from the support strand, said header means having spaced longitudinal edges; attachment means for securing said header means relative to a support strand such that said header means is spaced from and generally parallel to suspended cable segments; a plurality of housing segments; means pivotally securing one of said housing segments adjacent each longitudinal edge of said header means such that each housing segment is movable from a closed position, wherein said header means and said housing segments encircle the cable segments, to an open position wherein each housing segment is elevated to provide access to the cable segments and free clearance on both sides and from below the cable segments.

2. An aerial closure according to claim 1, with the addition of: seal means adjacent the ends of said housing segments to sealingly engage each of said housing segments and the cable segments.

3. An aerial closure according to claim 1, said attachment means comprising: an arm; means securing said arm to said elongated header means; and clamp means secured to said arm.

4. An aerial closure according to claim 3, said clamp means having surfaces configured to displace insulation on said support strand.

5. An aerial closure according to claim 3, said clamp means comprising: an arm having inclined surfaces forming a tapered slot; and means movably securing said clamp means relative to said arm such that the support strand is urged toward said inclined surfaces by said clamp means.

6. An aerial closure according to claim 5, said means movably securing said clamp means comprising: threaded means extending through apertures in said arm and said clamp means such that said clamp means is rotatable about said threaded means relative to said arm; and retainer means adjacent said threaded means to maintain said clamp means in a predetermined position relative to said arm.

7. An aerial closure according to claim 5, said clamp means having surfaces coined to pierce insulation on said support strand.

8. An aerial closure according to claim 1, with the addition: conductor means electrically connected to said attachment means; and means securing said conductor means to grounding conductors in an electrical cable to provide continuity of a ground circuit across the splice.

9. An aerial closure according to claim 1, with the addition of: latch means on a first one of said housing segments engageable with a second one of said housing segments for detachably securing said first housing segment to said second housing segment.

10. An aerial closure according to claim 9, said latch means comprising: threaded means extending through passages formed in said housing segments.

11. An aerial closure according to claim 9, said latch means comprising: a locking member movably secured to said first housing segment, said locking member being movable between a first position engaging said second housing segment and a second position disengaged from said second housing segment.

12. An aerial closure according to claim 11 said latch means further comprising: threaded means extending through passages formed in said housing segments.

13. An aerial closure according to claim 1, with the addition of: retainer means movably secured relative to said header means and said housing segments to urge each of said housing segments toward said open position wherein each housing segment is elevated.

14. An aerial closure according to claim 1, each of said housing segments having a non-linear edge, the non-linear edge on a first of said housing segments being complementary to the non-linear edge on a second of said housing segments.

15. An aerial closure for enclosing electrical or optical cable splices in cable segments suspended from a support strand comprising: elongated header means for supporting the closure from the support strand, said header means having spaced longitudinal edges; attachment means for securing said header means relative to a support strand such that said header means is spaced from and generally parallel to suspended cable segments; a plurality of housing segments; means pivotally securing one of said housing segments adjacent each longitudinal edge of said header means such that each housing segment is movable from a closed position, wherein said header means and said housing segments encircle the cable segments, to an open position wherein each housing segment is elevated to provide access to the cable segments and free clearance on both sides and from below the cable segments; end seal shell means adjacent the ends of said housing segments to sealingly engage each of said housing segments; connector mean securing said end seal shell means to at least one of said housing segments; and end seal means engaging said end seal shell means to sealingly engage at least one of the cable segments.

16. An aerial closure according to claim 15, said end seal shell means comprising: a pair of spaced flanges; and web means extending between said spaced flanges for supporting said end seal means.

17. An aerial closure according to claim 16, said connector means comprising: a projection on said web means extending into an aperture on one of said housing segments.

18. An aerial closure according to claim 15, said end seal means comprising: a plurality of elastomeric seal elements having aligned apertures extending therethrough, said elastomeric seal elements having a slot extending from each of said apertures through an edge of the elastomeric seal element, said slots in each of said elastomeric seal elements extending from said apertures in different directions.

19. An aerial closure according to claim 18, said elastomeric seal elements having an array of concentric corrugations forming alternating ribs and grooves.

20. An aerial closure according to claim 19, each rib of said array of concentric corrugations having indicia formed thereon to indicate the size of an opening formed by cutting along the adjacent groove.

21. An aerial closure for enclosing cable splices in cable segments suspended from a support strand comprising: a housing body of unitary construction, said body having a central section, said central section being bounded by spaced longitudinally extending deformable hinge portions that movably secure spaced wing segments adjacent opposite sides of said central segment, end portions of each of said wing segments being configured to form seal receiving indentations, said body being configured to permit movement of said spaced wing segments relative to said central section from a closed position wherein said central section and said wing segments encircle a cable to an open position wherein each wing segment is elevated above the cable.

22. An aerial closure according to claim 21, said housing body having non-linear edges on each of said wing segments, said non-linear edge on one of said wing segments mating with said non-linear edge on the other of said wing segments, said non-linear edges being configured to prevent longitudinal movement of said wing segments without restricting rotational movement of said wing segments relative to said central segment.

23. An aerial closure according to claim 22, each of said seal receiving indentations having sockets formed therein, each of said sockets being configured to retain segments of seal elements in said seal receiving grooves.

24. An aerial closure for enclosing cable splices in cable segments suspended from a support strand comprising: a housing body of unitary construction, said body having a central section, said central section being bounded by spaced longitudinally extending deformable hinge portions adjacent opposite sides of said central segment that movably secure spaced wing segments, said wing segments having non-linear edges configured to permit passage of air and liquid condensate between said non-linear edges of said wing segments when said non-linear edges are positioned in juxtaposed relation one to the other, said non-linear edge on one of said wing segments mating with said non-linear edge on the other of said wing segments, said non-linear edges being configured to prevent longitudinal movement of said wing segments without restricting rotational movement of said wing segments relative to said central segment, end portions of each of said wing segments being configured to form seal receiving indentations.

25. An aerial closure according to claim 24, said housing body having a severable central portion extending across said central section and each of said wing segments, each of said wing segments having deformed portions adjacent opposite sides of said severable portion to form seal receiving indentations.

26. An aerial closure for enclosing cable splices in cable segments suspended from a support strand comprising: a housing body of unitary construction, said body having a central section, said central section being bounded by spaced longitudinally extending deformable hinge portions that movable secure spaced wing segments adjacent opposite sides of said central segment, end portions of each of said wing segments being configured to form seal receiving indentations, said housing body being formed by blow molded plastic material such that each of said wing segments and said central segment are formed by spaced layers of plastic material having an interior chamber between said spaced layers of plastic material.

27. An aerial closure according to claim 26, each of said wing sections having locking shoulders formed thereon, each of said locking shoulders being configured to secure edges of said wing segments in juxtaposed relation.

28. An aerial closure according to claim 27, each of said locking shoulders having a web portion having an aperture extending through said web portion.

29. An aerial closure according to claim 27, at least one of said locking shoulders having a web portion having a groove formed to receive a latch member.

30. An aerial closure for enclosing cable splices comprising:
    (a) elongated header means having spaced edges;
    (b) attachment means for attaching said header means to an aerial messenger cable such that said header means is spaced from and generally parallel to a cable;
    (c) a plurality of housing segments;
    (d) means movably securing a housing segment adjacent each edge of said header means such that each housing segment is movable from a closed position wherein said header means and said housing segments encircle the cable to an open position wherein each housing segment is elevated above the cable.

31. The aerial closure of claim 30, with the addition of, seal means adjacent the ends of said housing segments to sealingly engage each of said housing segments and the cable.

32. An aerial enclosure for a splice in a telecommunications cable comprising:
    a) an elongate housing comprising a first and second member;
    b) an elongate hinge connecting the first and second members together;
    c) a retainer secured to a surface of the first member; and
    d) a bail secured to a surface of the second member such that the second member can be releasably locked in an open position by the retainer and bail.

33. An aerial enclosure for a cable splice comprising:
    a) an elongate housing comprising a first, second, and third member;
    b) a first elongate hinge connecting the first and second members together;
    c) a second elongate hinge connecting the second and third members together;
    d) retailer bails on each of the first and third member; and e) a retainer bracket on said second member such that the first and third members can be releasably locked in an open position by the respective retainer bails and retainer bracket.

34. The enclosure of claim 33 wherein the enclosure is a plastic enclosure.

35. The enclosure of claim 33 wherein the enclosure is blow-molded.

36. The enclosure of claim 33 wherein the enclosure is a double-walled enclosure.

37. The enclosure of claim 33 wherein the hinges are integral hinges.

38. The enclosure of claim 33 further including end seal members disposed on each end of the enclosure.

39. The enclosure of claim 33 further including a latch member on at least one of said first and third members for holding said first and third members in a closed position.

40. The enclosure of claim 33 further including a hanging bracket assembly secured to said second member for attaching said second member to a support strand.

* * * * *

UNITED STATES PATENT AND TRADEMARK OFFICE
CERTIFICATE OF CORRECTION

PATENT NO. : 5,322,973
DATED : June 21, 1994
INVENTOR(S) : Gideon B. Dagan

It is certified that error appears in the above-indentified patent and that said Letters Patent is hereby corrected as shown below:

Column 8, line 21, change "sleeve 90" to read -- sleeve 110 --.

Column 8, line 24, change "nut 104" to read -- nut 84 --.

Column 8, between lines 33 and 34, insert -- splice work is completed. The locking assembly 114 may -- .

Column 12, line 67, change "retailer" to read -- retainer --.

Column 12, line 67, change "member" to read -- members --.

Signed and Sealed this

Twenty-seventh Day of September, 1994

Attest:

BRUCE LEHMAN

Attesting Officer      Commissioner of Patents and Trademarks